US005483211A

United States Patent [19]

Carrodus et al.

[11] Patent Number: 5,483,211

[45] Date of Patent: Jan. 9, 1996

[54] TWO-POLE COMPARTMENTALIZED GROUND FAULT MINIATURE CIRCUIT BREAKER WITH A SINGLE CENTRAL ELECTRONICS COMPARTMENT

[75] Inventors: Melvin A. Carrodus, Beaver, Pa.; Robert D. Bradley, Lawrenceville, Ga.; Michael J. Whipple, Oakdale; Garry B. Theadore, Beaver Falls, both of Pa.

[73] Assignee: Eaton Corporation, Cleveland, Ohio

[21] Appl. No.: 264,571

[22] Filed: Jun. 23, 1994

[51] Int. Cl.[6] .................... H01M 73/00

[52] U.S. Cl. .................... 335/18; 335/202

[58] Field of Search .................... 335/18, 8–10, 335/202; 361/42–50

[56] References Cited

U.S. PATENT DOCUMENTS

| | | | |
|---|---|---|---|
| 3,566,318 | 2/1971 | Gelzheiser et al. . | |
| 3,999,103 | 12/1976 | Misencik et al. . | |
| 4,568,899 | 2/1986 | May et al. | 335/18 |
| 4,641,217 | 2/1987 | Morris et al. | 335/18 |
| 5,260,676 | 11/1993 | Patel et al. . | |

*Primary Examiner*—Lincoln Donovan
*Attorney, Agent, or Firm*—Martin J. Moran

[57] ABSTRACT

A miniature circuit breaker with two thermal-magnetic poles has an electronic trip device providing ground fault, and sputtering arc fault (if desired), protection located entirely in a large central compartment of a molded housing between compartments housing the two mechanical poles. The molded housing is assembled from a top base and top cover forming a compartment for the thermal-magnetic trip device of the first pole, and a bottom cover and a bottom base forming the compartment for the second mechanical pole. A hollow center piece mates with the top and bottom bases to form the single, large electronics compartment.

8 Claims, 11 Drawing Sheets

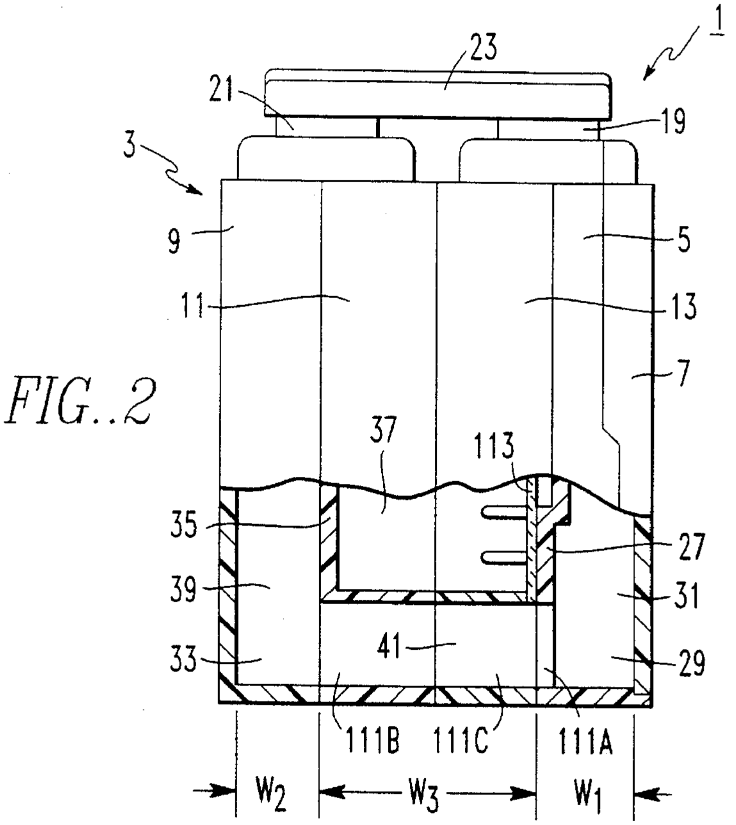
FIG..2
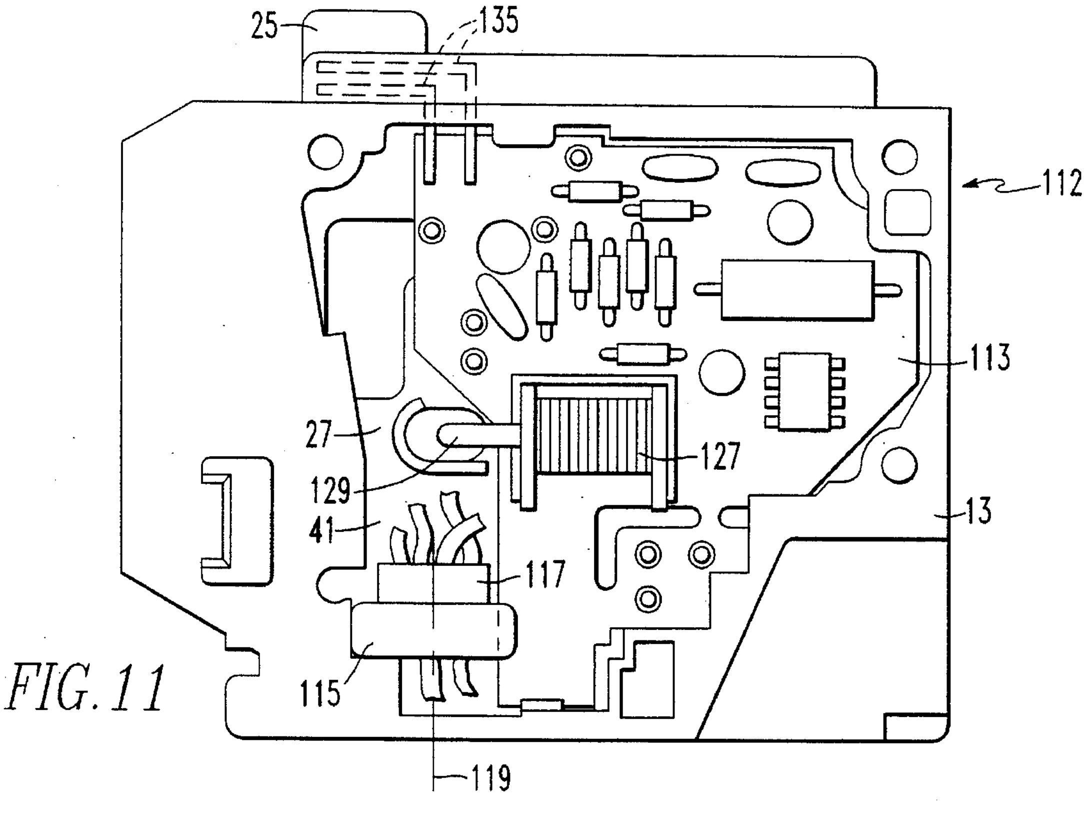
FIG. 11

FIG. 3A
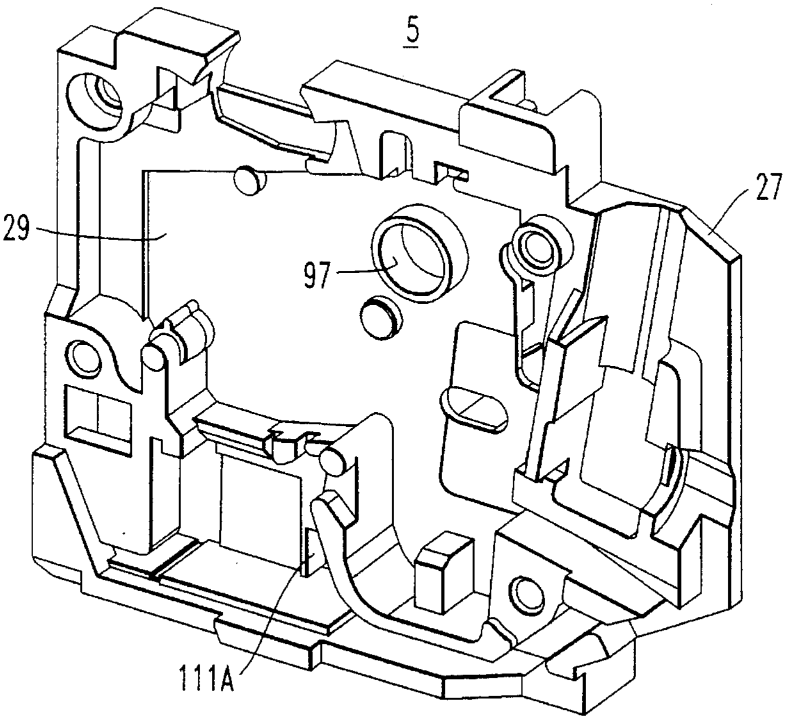
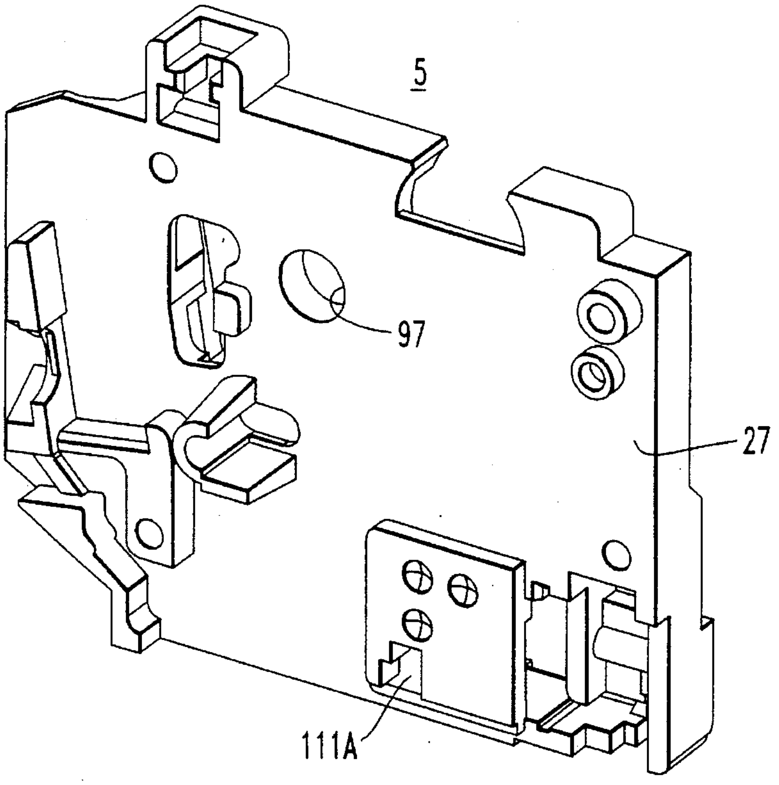
FIG. 3B

FIG. 4A
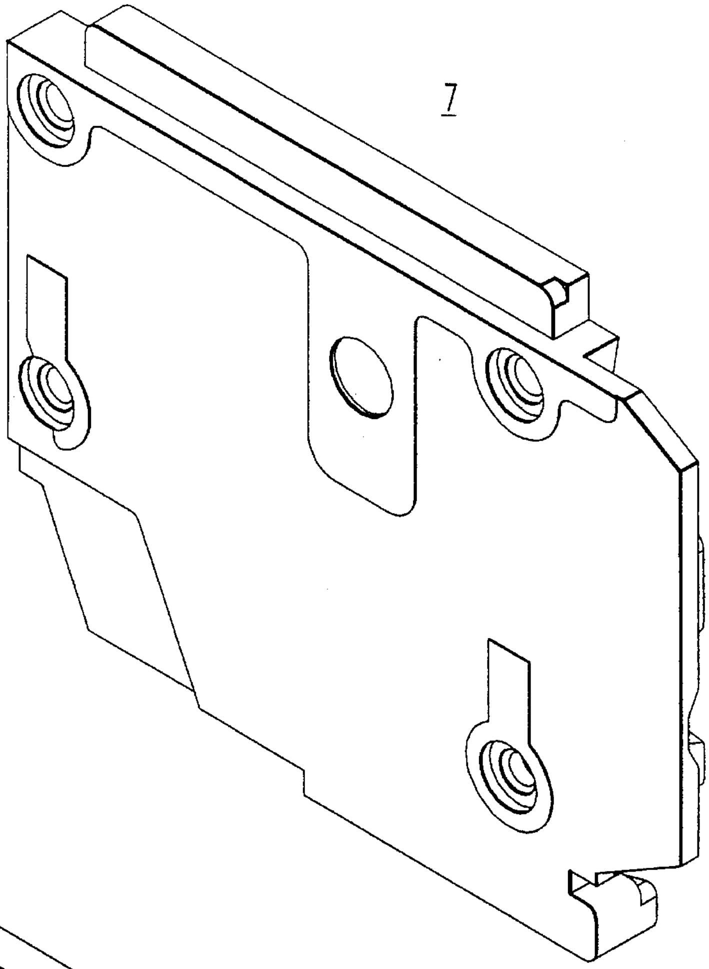
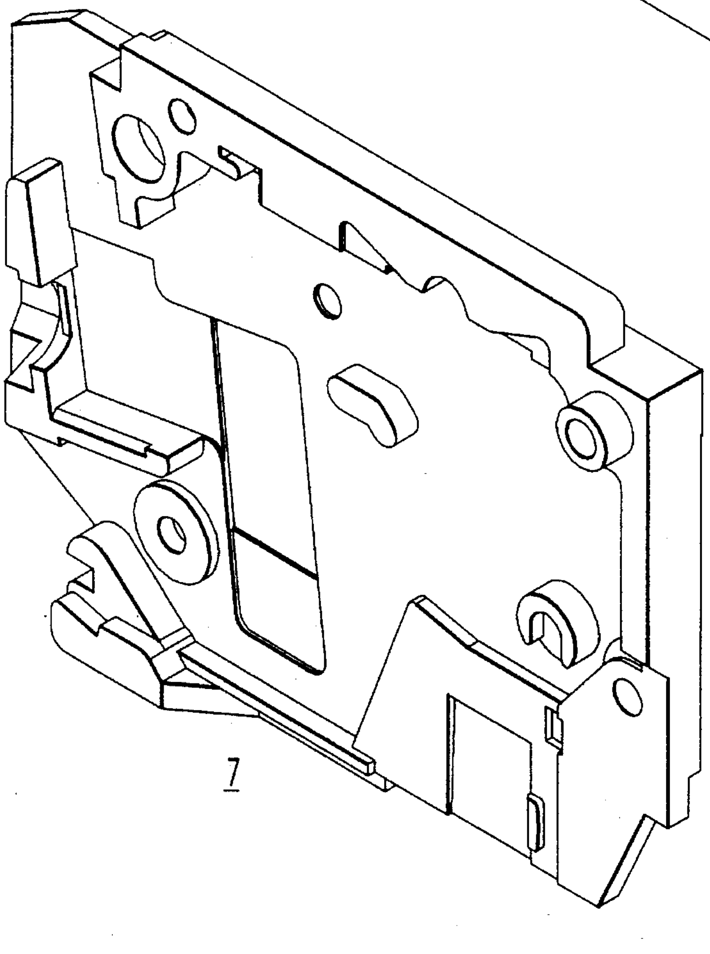
FIG. 4B

TWO-POLE COMPARTMENTALIZED GROUND FAULT MINIATURE CIRCUIT BREAKER WITH A SINGLE CENTRAL ELECTRONICS COMPARTMENT

CROSS-REFERENCE TO RELATED APPLICATIONS:

Commonly owned, concurrently filed applications entitled "Two-Pole Compartmentalized Ground Fault Miniature Circuit Breaker with Increased Current Rating" by Joseph P. Fello and Michael J. Whipple Ser. No. 08/264,572 filed 6/23/94, and entitled "Miniature Circuit Breaker with Ground Fault Electronics Supported by Stiff Conductors for Easy Assembly" by Lance Gula and Michael J. Whipple Ser. No. 08/264,559 filed 6/23/94.

BACKGROUND OF THE INVENTION

1. Field of the Invention

This invention relates to multi-pole miniature circuit breakers with ground fault protection having a molded housing with separate compartments for each mechanical pole and the ground fault circuits, and more particularly, to such circuit breakers having all of the electronics for ground fault protection located entirely in a single central compartment.

2. Background of Information

Circuit breakers used in residential and light commercial installations are referred to as miniature circuit breakers. Such circuit breakers have molded insulative housings of standard dimensions sized to interchangeably plug into or bolt onto the hot stabs in a load center or panel board. Two-pole miniature circuit breakers incorporate two trip devices in a common housing which occupies two adjacent positions in the load center or panel board.

Examples of a two-pole miniature circuit breaker are provided in U.S. Pat. Nos. 3,999,103 ('103 patent) and 5,260,676 ('676 patent). As is typical for miniature circuit breakers, the two-pole breakers of these patents utilize thermal-magnetic trip devices to provide overload and short circuit trip functions for the protected circuits. These circuit breakers also include an electronic circuit which provides ground fault protection.

The housings for the two-pole ground fault circuit breakers of the '103 and '676 patents essentially comprise two single pole breaker housings bolted together. Each half includes two stacked molded trays forming side-by-side compartments and a cover for the open compartment. The thermal-magnetic trip unit for the pole is mounted in one compartment and part of the circuits for ground fault protection is provided in the other compartment. With the two halves bolted together, the two mechanical poles are separated by one of the electronic compartments. The '676 patent suggests a single, double sized electronic compartment as an alternative, but provides no hint of how that would be implemented.

In the '103 patent most of the ground fault protection circuit is provided in the electronic compartment between the two magnetic poles including a toroidal sensing coil. However, separate trip solenoids are provided for each pole and are located in the respective electronic compartments. These trip solenoids have a lever on the plunger which extends through an opening in the partition between the mechanical pole and the electronic compartment and which engages the thermal-magnetic device to trip the pole.

The '676 patent utilizes a ground fault circuit providing neutral to ground as well as line to ground fault protection. The circuit used requires two toroidal coils which occupy the electronic compartment between the two mechanical pole compartments. The remainder of the electronic circuitry, including a single trip solenoid with separate windings for the two poles, is located in the other electronic compartment.

This splitting of the electronic trip circuit as described in both the '103 and '676 patents necessitates the routing of wires between the two electronic compartments in addition to the routing of wires from the mechanical poles to the electronic compartments. This complicates the task of assembling the two pole ground fault circuit breaker. In addition, the widths of the two electronic compartments are limited. This limited width dictated that the toroidal coils in the '676 patent, and the output transformer in the '103 patent used in the ground fault circuit had to be mounted with their central axes crosswise within the main electronic compartment.

There is a need therefore, for an improved two-pole ground fault circuit breaker.

More particularly, there is a need for such a circuit breaker which is easier to assemble, and specifically such a circuit breaker in which all of the electronics are housed in a single electronic compartment.

There is yet another need for such a circuit breaker which has a housing with fewer parts and is easier to assemble.

SUMMARY OF THE INVENTION

These and other needs are satisfied by the invention which is directed to a two-pole circuit breaker which maintains the standard dimensions for use in load centers and panel boards, but which has a single large electronic compartment, preferably between two compartments housing thermal-magnetic operating mechanisms of the two poles.

The single, larger electronic compartment, which has the combined width of the previous two electronic compartments, accommodates electronics for providing both ground fault protection, and if desired, sputtering arc fault protection. The increased width of the electronic compartment allows the toroidal coils of the electronic circuits to be oriented with their central axes perpendicular to the width of the compartment. In addition, the location of all the electronics in a single compartment simplifies assembly of the circuit breaker. Assembly is also facilitated by the reduction in the number of pieces forming the molded insulative housing. In particular, the molded housing comprises a molded top base forming a first compartment in which the first thermal-magnetic operating mechanism is located. A molded top cover mates with this molded top base to enclose the first compartment. A molded bottom cover has a cavity forming a second compartment in which the second thermal-magnetic operating mechanism is located. A molded bottom base mates with the bottom cover and has a partition enclosing the second compartment. The molded bottom base also forms a third cavity separated from the second compartment by the second partition. The final element of the molded housing is a hollow center molded base which mates with both the molded top and bottom bases to form with the third cavity the third compartment between the first and second compartments and in which the electronic trip means is located.

BRIEF DESCRIPTION OF THE DRAWINGS

A full understanding of the invention can be gained from the following description of the preferred embodiments when read in conjunction with the accompanying drawings in which:

FIG. 2 is an end view of the circuit breaker of FIG. 1 with some parts broken away.

FIGS. 3A and B through 7A and B are isometric views of the two sides of each of the molded sections of the housing which forms part of the circuit breaker of FIG. 1.

FIG. 11 is a vertical sectional view taken along the line 11—11 in FIG. 1 through the electronic compartment.

DESCRIPTION OF THE PREFERRED EMBODIMENTS

Figure 1:
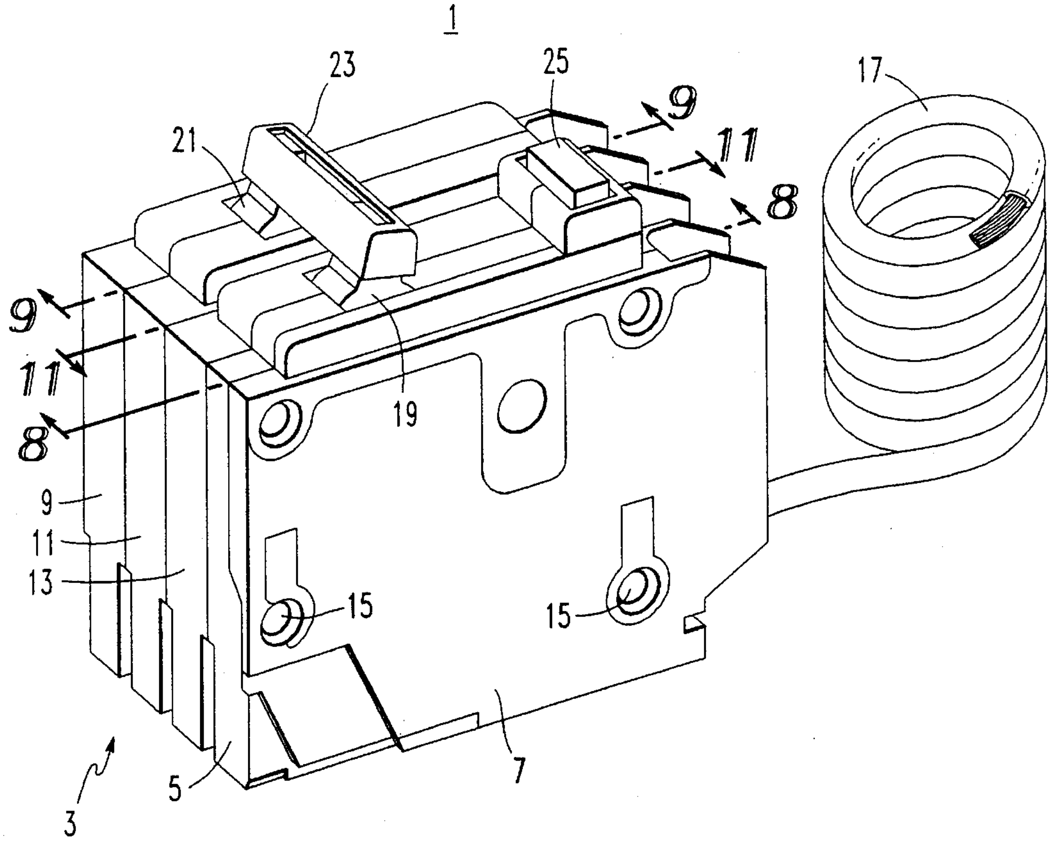
FIG. 1 is an isometric view of a two-pole, ground fault circuit breaker in accordance with the invention.

Referring to FIG. 1 a two-pole ground fault circuit breaker 1 in accordance with the invention comprises a housing 3. The housing 3 is molded in sections from an electrically insulating material such as a thermal setting resin. The sections of the housing 3 include a top base 5, a top cover 7, a bottom cover 9, a bottom base 11 and a hollow center base 13, all secured together such as by rivets 15. As shown in FIG. 1, a pigtail 17 connects a neutral conductor within the circuit breaker to a neutral bar (not shown) in a load center in which the circuit breaker 1 may be mounted. Each of the poles of the circuit breaker has an operating handle 19 and 21 which may be operated in unison by the handle tie 23. In addition, the operation of the ground fault circuit of the circuit breaker 1 can be tested by depressing the test button 25.

Turning to FIGS. 2 and 3A and 3B, it can be seen that the top base 5 forms a first partition 27 which serves as a wall of a first cavity 29. Within the cavity 29 are various molded elements which as will be seen support the mechanism of the first pole. The top cover 7, shown in FIGS. 4A and 4B, mates with the top base 5 to enclose the cavity 29, thereby forming a first compartment 31. The top cover 7 in the orientation shown in FIG. 4A mates with the front of the top base 5 as shown in 3A.

Figure 5A:
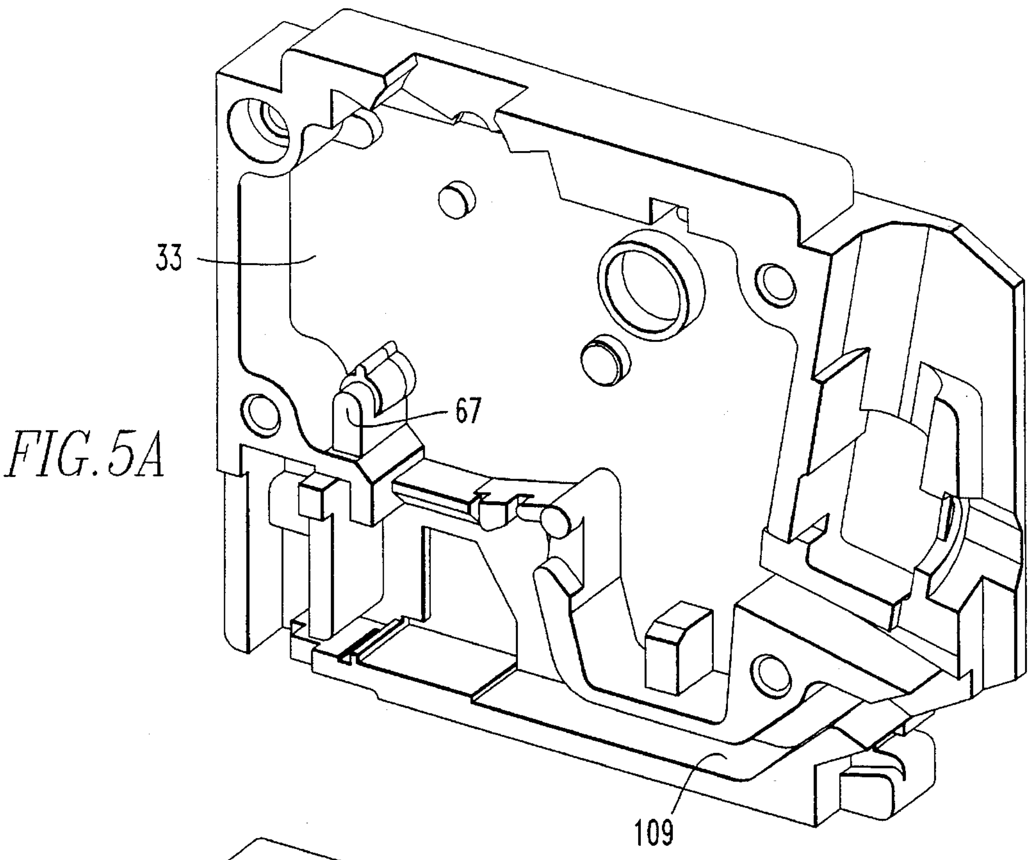
Figure 5B:
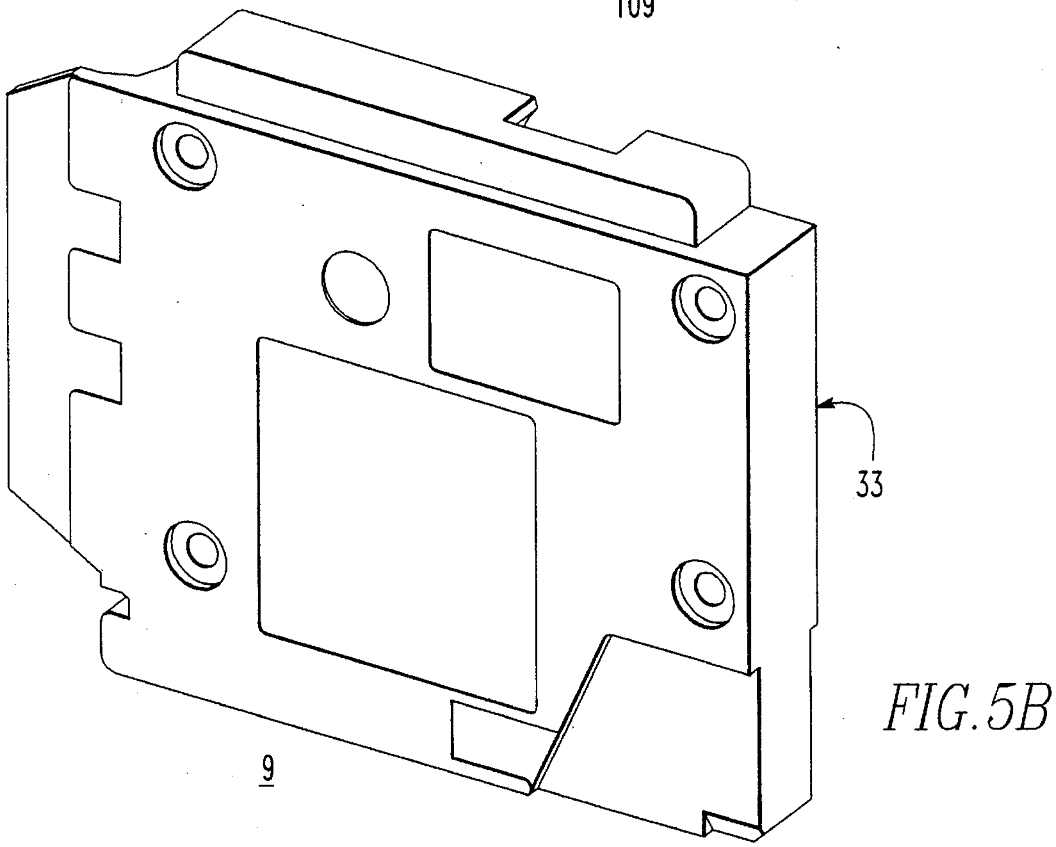

The bottom base 9 shown in FIGS. 5A and 5B forms a second cavity 33, in which as will be seen, the second mechanical pole of the circuit breaker is mounted. As in the case of the first cavity 29, the second cavity 33 includes molded elements for supporting the second mechanical pole.

Figure 6A:
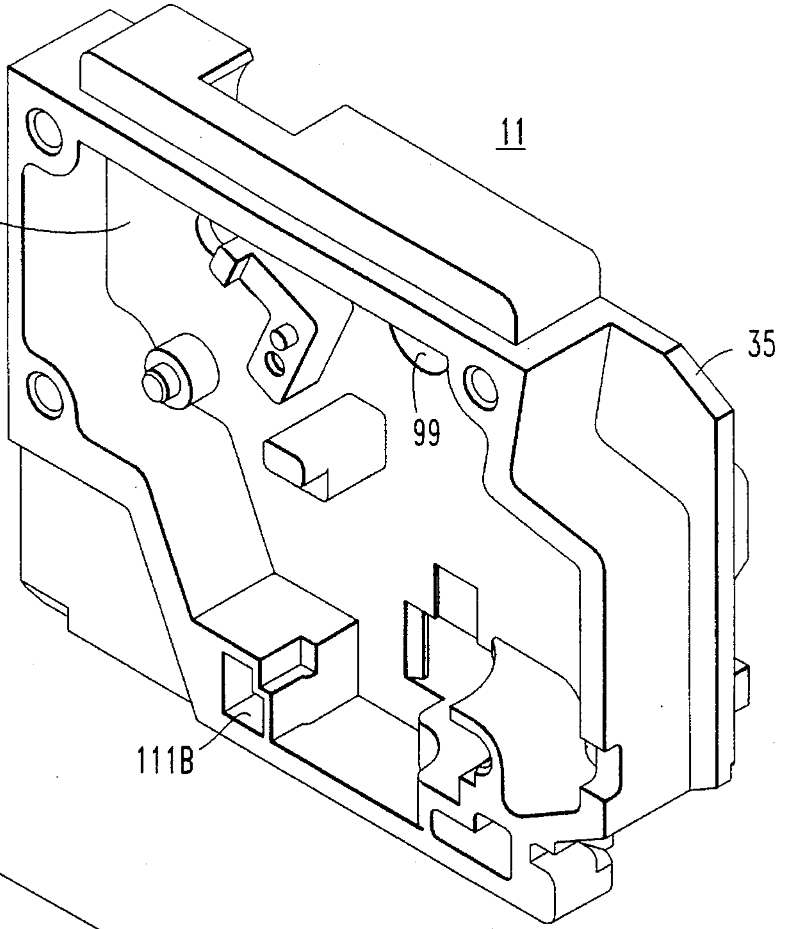
Figure 6B:
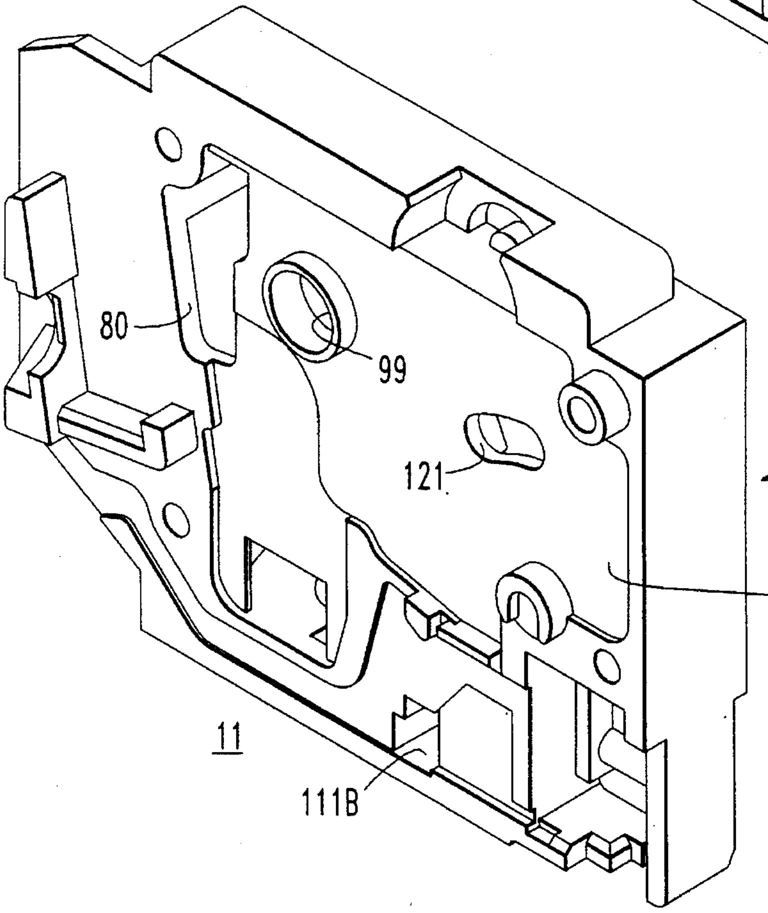

The bottom base 11, as shown in FIGS. 6A and 6B forms a second partition 35 defining a wall of a third cavity 37. The bottom base 11 mates with the second cover 9 so that the second partition 35 encloses the second cavity 33 to form the second compartment 39, as shown in FIG. 2.

Figure 7A:
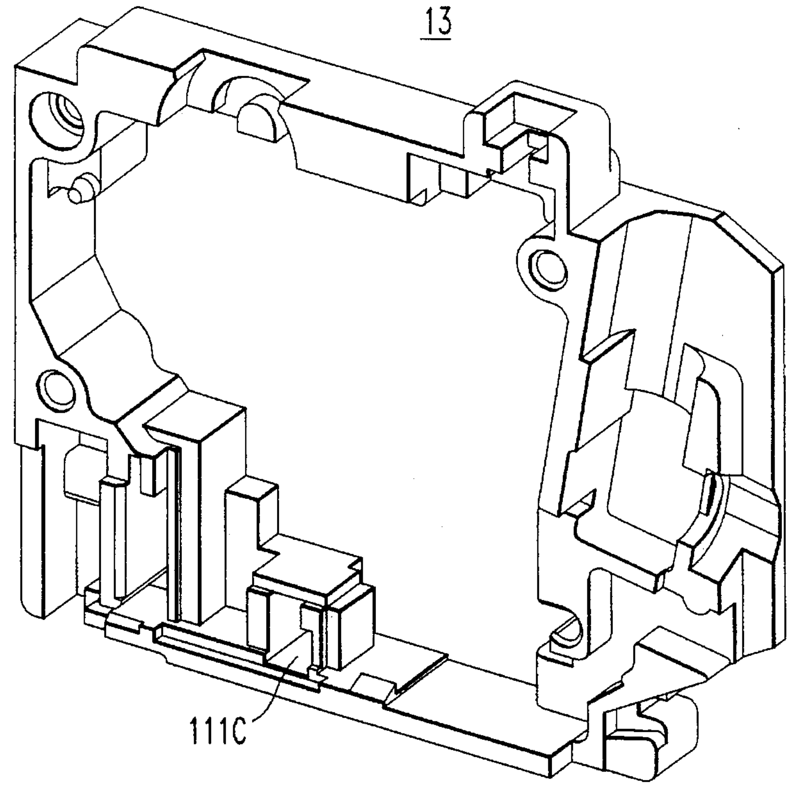
Figure 7B:
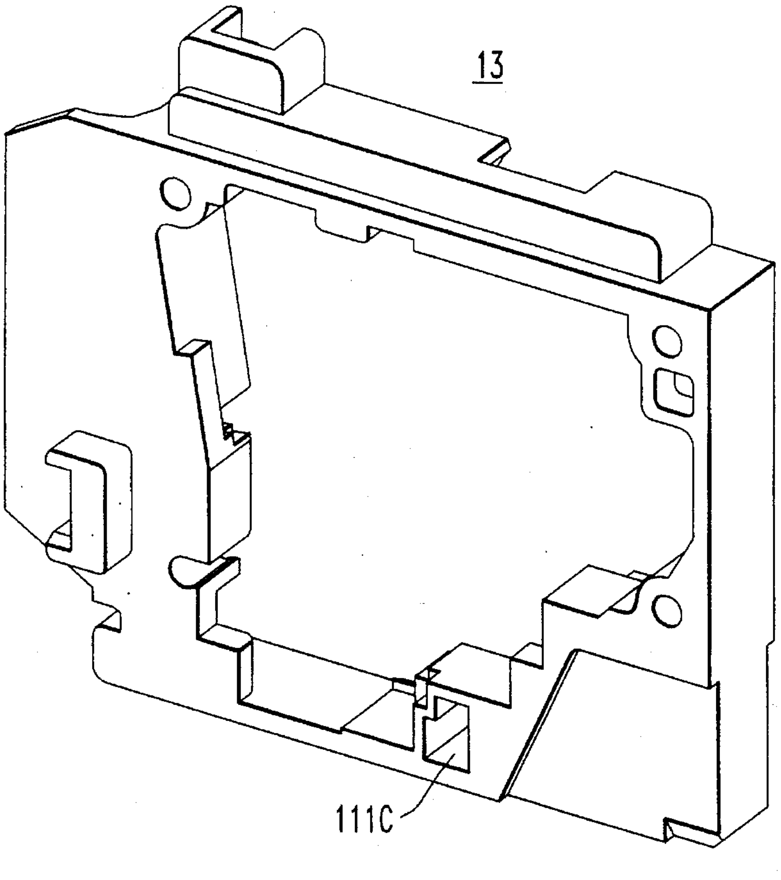

The hollow center base 13 shown in FIGS. 7A and 7B mates with the bottom base 11 and the top base 5, to form with the cavity 37, a third compartment 41 between the first partition 27 and the second partition 35. (See FIG. 2).

Referring to FIG. 2, the width $W_3$ of the third compartment 41 as measured perpendicular to the partitions 27 and 35 is essentially twice the widths $W_1$ and $W_2$ of the first compartment 31 and second compartment 39. As will be seen, this provides a large contiguous space for the electronic trip circuits.

Figure 8:
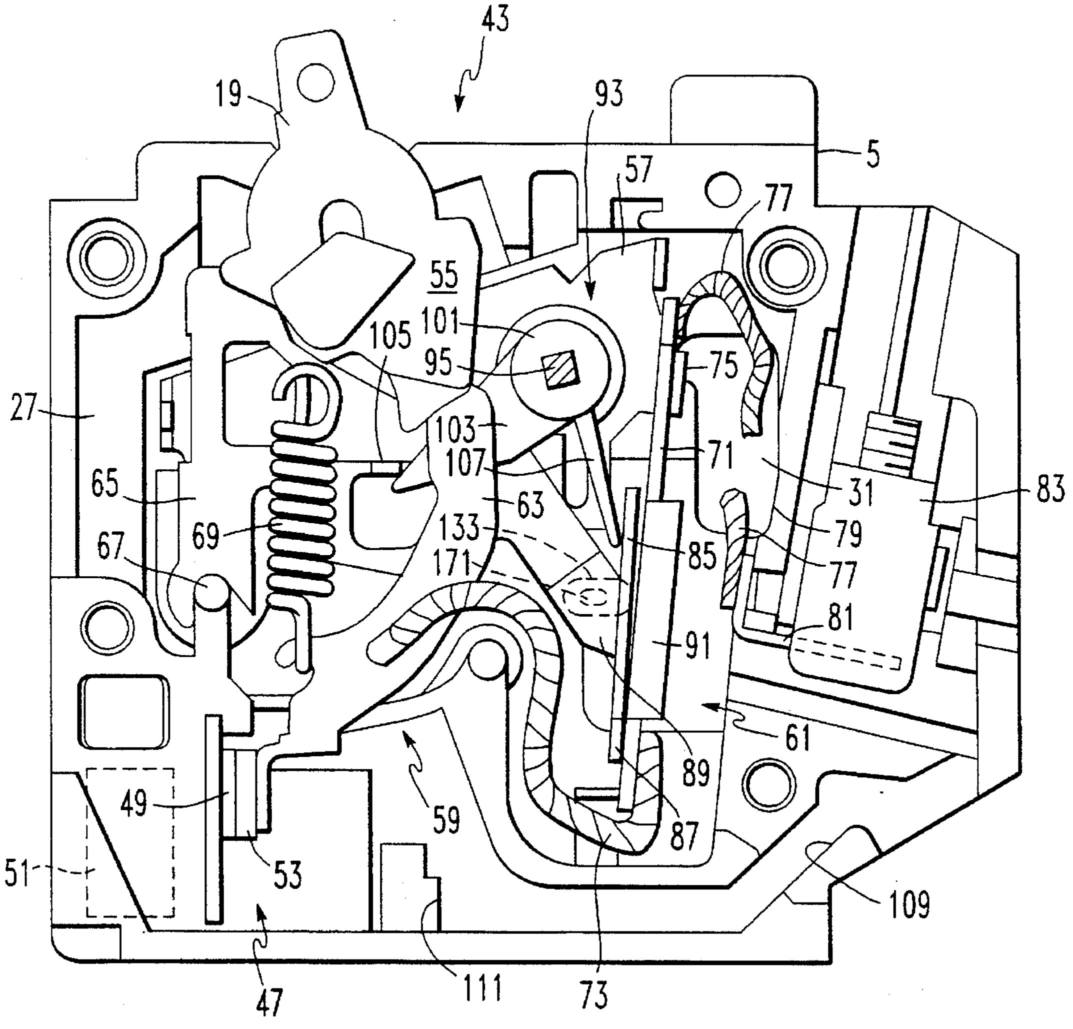
FIG. 8 is a vertical sectional view taken along the line 8—8 in FIG. 1 of one of the mechanical poles shown in the closed position.
Figure 9:
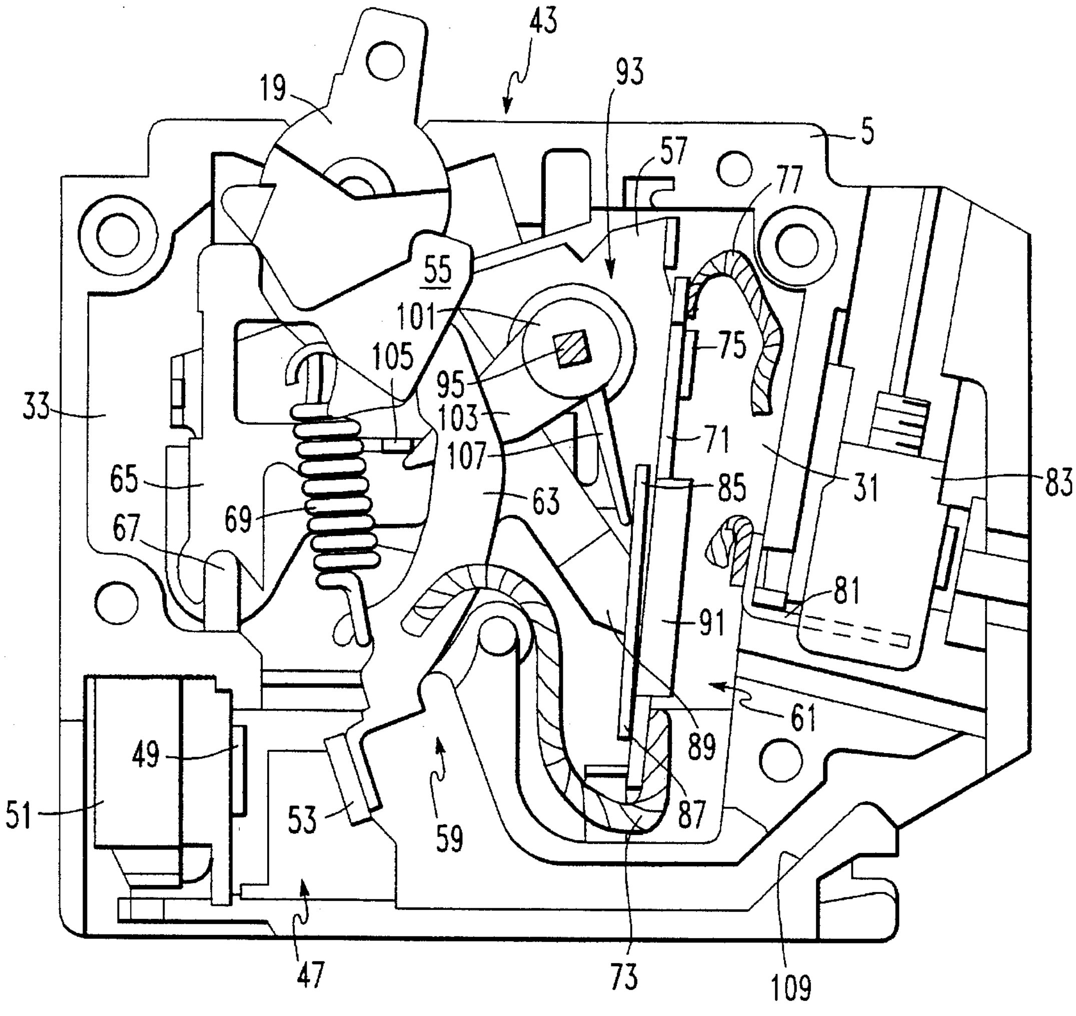
FIG. 9 is a vertical sectional view taken along the line 9—9 in FIG. 1 of the other mechanical pole shown in the open position.
Figure 10A:
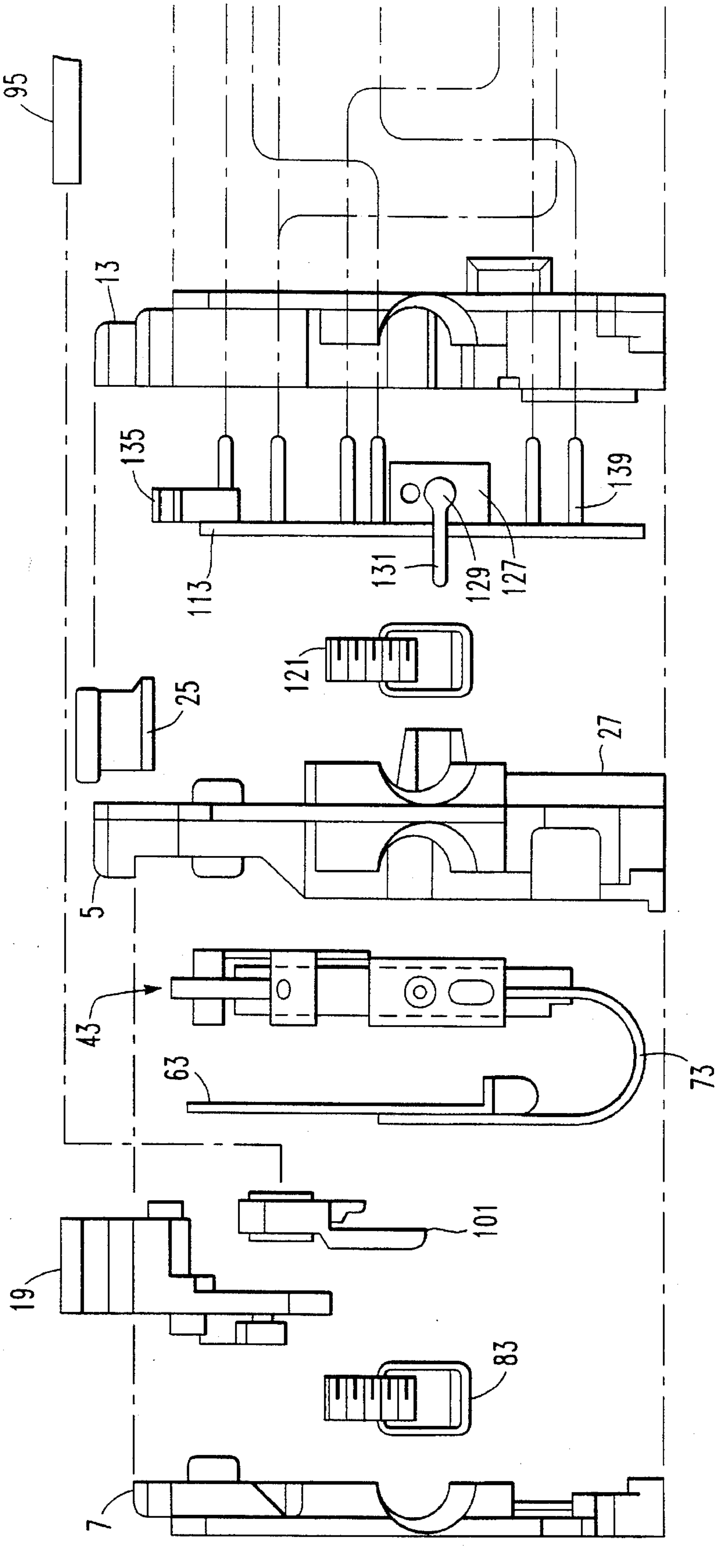
FIGS. 10A and 10B when placed side by side illustrate an exploded end view of the circuit breaker of FIG. 1.
Figure 10B:
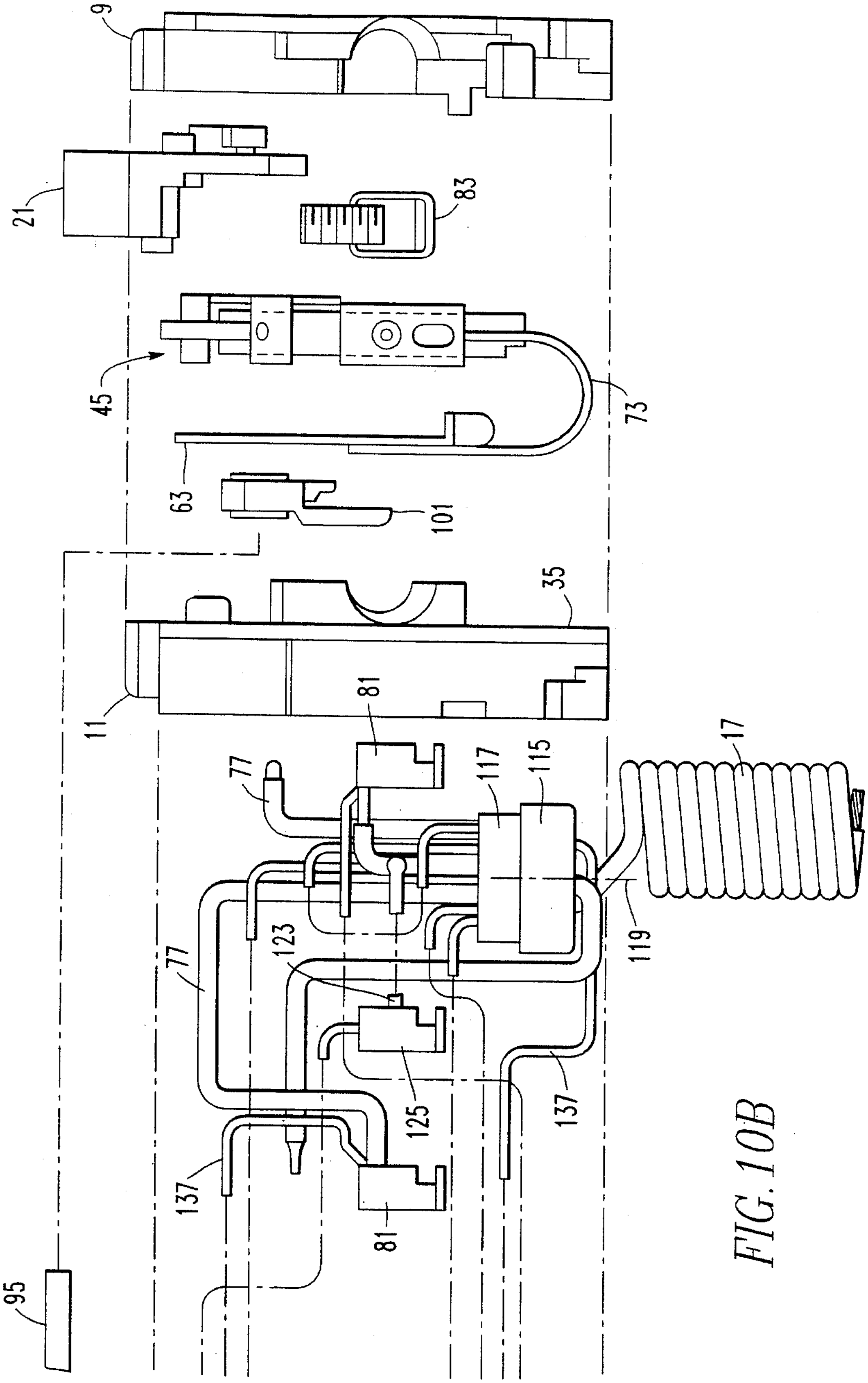

As shown in FIGS. 8 and 9, the first and second mechanical poles 43 and 45 are located in the compartments 31 and 39, respectively. As the mechanical poles are similar to those utilized in U.S. Pat. No. 3,999,103, which is hereby incorporated by reference, they will only be described generally. Each of these mechanical poles 43 and 45 has a set of separable contacts 47 including a fixed contact 49 connected to a line terminal 51 and a moveable contact 53. The mechanical poles 43 and 45 further include a thermal-magnetic operating mechanism 55. The thermal magnetic operating mechanism 55 includes a supporting metal frame 57, an operating mechanism 59 and a trip device 61.

Briefly, the operating device 59 includes a contact arm 63 carrying the moveable contact 53 at a lower end and a cradle 65 pivoted about the molded pivot point 67 in the base 5 and bottom cover 9, respectively. The contact arm 63 is connected to the cradle 65 by a helical tension spring 69. The upper end of the contact arm 63 is engaged by the handle 19 or 21. Movement of the handle to the on position as shown in FIG. 8 rotates the contact arm 63 to close the separable contacts 47. When the handle, such as 21 is moved to the off position as shown in FIG. 9, the contact arm 63 rotates away from the fixed contact 49 to open the separable contacts 47.

The contact arm 63 is electrically connected to the lower end of an elongated bi-metal element 71 by flexible conductor 73. The bi-metal 71 is part of the trip device 61 and is secured at its upper end to a flange 75 on the frame 57. A flexible line conductor 77 connected to the upper end of the bi-metal 71 of the pole 43 passes through an opening 79 in the fast partition 27 into the third or electronics compartment 41 and returns to the first compartment 31 back through the opening 79 and is connected to a tang 81 engaging a load connector 83. The flexible conductor 77 on the mechanical pole 45 passes through the opening 80 in the position partition 35 into the compartment 41 and returns through the same opening. Thus, a closed circuit through the mechanical poles 43 and 45 extends from the line terminal 51 through the fixed contact 49, the moveable contact 53, the contact arm 63 the flexible conductor 73, the bi-metal element 71, the flexible load conductor 77, and the tang 81 to the load connector 83.

The trip device 61 includes the bi-metal element 71, an elongated rigid magnetic armature or latch members 85 secured to the lower end of the bi-metal 71 by a flexible metal strip 87, and a finger 89 on the cradle 65.

As is well known in this type of circuit breaker, the magnetic armature 85 has an opening (not shown) which defines a latch surface on which the finger 89 of the cradle 65 is latched when the mechanical pole is reset by moving the handle slightly past the off position.

When the circuit breaker is in the on position as shown in FIG. 8 and an overload current above a first predetermined value is sustained, the bi-metal 71 is heated by the current flowing therethrough and deflects counterclockwise as seen in FIG. 8 to unlatch the finger 85 of the cradle whereupon the spring 69 trips the contact arm to a trip position (not shown) to open the separable contacts 47. When a short circuit occurs with the circuit breaker in the on position, the current generates a magnetic field which is channeled by a U-shaped piece 91 mounted on the hi-metal which attracts the magnetic armature toward the pole piece to unlatch the cradle and thereby trip the separable contacts open.

A common trip device 93 insures that when one mechanical pole trips, the other pole trips simultaneously. This common trip device 93 includes a shaft 95 extending through the third compartment 41, an opening 97 in partition 27 (see FIGS. 3A and 3B), an opening 99 in partition 35 (See FIGS. 6A and 6B) into the first compartment 31 and second compartment 39. On each end of the shaft 95 is an actuating member 101. The actuating member 101 has a first leg 103 disposed adjacent a flange 105 on the cradle of the associated operating mechanism and a second leg 107 which is adjacent the magnetic armature or latch member 85. When one of the poles of the circuit breaker trips, the associated cradle 65 engages the first leg 103 and rotates the shaft 95. This rotates the actuating member 101 on the other end of the shaft 95 so that the second leg 107 of that actuating member engages the associated magnetic armature or latch member 85 to unlatch the cradle 65 and trip the other pole.

When either of the mechanical poles 43 or 45 trips in response to a short circuit, an arc is struck between the opening moveable contact 53 and fixed contact 49. This generates gases which are vented through the gas vent 109 molded into the housing 3. This is satisfactory for miniature circuit breakers with a current rating up to about 15 amps; however, when attempts have been made to increase the current rating, for instance up to about 50 or 60 amps, which requires the ability to interrupt currents of 5,000 to 10,000 amps, the vents 109 proved to be inadequate to release the generated gases rapidly enough to avoid a pressure buildup within the compartment housing the tripped pole to such a magnitude that the housing was blown apart.

In accordance with the invention, a gas channel 111 is molded into the housing 3 to connect the compartments 31 and 39 containing the first and second mechanical poles 43 and 45. This gas channel 111 has a first section 111A formed in the first partition 27 of the top base 5, a second section 111B formed in the second partition 35 of the bottom base 11, and a third section 111C formed in the hollow center base 13. Thus, the gas vent 111 extends through the third electronics compartment 41 without communicating therewith.

The gas vent 111 communicates with the first compartment 31 and the second compartment 39 adjacent the separable contacts 47. Thus, the gases generated by the arc during interruption of a short circuit current in one pole can pass through the channel 111 so that the volumes of the two compartments 31 and 39 are shared and the gas pressure is reduced.

In addition to the thermal-magnetic poles 43 and 45, the circuit breaker 1 includes an electronic trip device 112. This electronic trip device 112 provides ground fault protection. A suitable ground fault protection device 112 is disclosed in U.S. Pat. No. 5,260,676. As mentioned above, the circuit breaker disclosed in U.S. Pat. No. 5,260,676 has four compartments with the circuitry for the electronic trip located in two compartments separated by 1 of the mechanical poles. As also mentioned above, the circuit breaker one of the present invention provides a large center compartment 41 in which all of the components of the electronic trip device 112 are located. The printed circuit board (PCB) 113 on which the electronic circuit for the ground fault protection is mounted is supported in the compartment 41 against the partition 27 of the top base as seen in FIGS. 2 and 11. The ground fault trip device is of the dormant oscillator type and utilizes a pair of toroidal sensing coils 115 and 117. These two coils are stacked one on top of each other within the compartment 41 with a common central axis 119 parallel to the partitions 27 and 35 defining the walls of the compartment. The flexible load conductor 77 of the first mechanical pole 43, which as discussed above extends from the bi-metal element 71 to the tang 81, passes through the opening 79 in the partition 27 into the compartment 41 and extends through the toroidal coils 115 and 117. Likewise, the flexible load conductor 77 of the second mechanical pole 45 extends from the bi-metal 71 through the opening 80 in the partition 35 of the bottom base I 1, passes through the toroidal coils 115 and 117, back through the opening 80 and is connected to a tang 81. A neutral conductor 123 also passes through the two toroidal coils 115 and 117 in a manner discussed in the U.S. Pat. No., 5,260,676. One end of the neutral conductor 123 is connected to the pigtail 17 and the other end is connected to a tang 125 of a load end neutral connector 121.

The electronic trip circuit 112 includes a dual wound solenoid 127 mounted on the printed circuit board 113. One of the windings on the dual wound solenoid 127 is energized when the ground fault is detected in the first mechanical pole 43 and the other is energized in response to a ground fault on the second pole 45. Energization of either winding results in the extension of the plunger 129. A finger 131 (See FIG. 8) on the plunger 129 extends through an opening 133 in the partition 27, so that energization of the solenoid 127 results in tripping of the first mechanical pole 43. As explained above, the second mechanical pole 45 is simultaneously tripped by the common trip device 93. The test button 25 is actuated by a spring biased by a resilient copper conductor 133 in a manner discussed in U.S. Pat. No. 5,293,522. Various leads 137 engage plugs 139 on the circuit board 113.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A two pole circuit breaker comprising:

first and second sets of separable contacts forming rest and second poles;

operating means comprising first and second thermal-magnetic operating mechanisms for operating said first and second sets of electrical contacts respectively, and electronic trip means responsive to currents flowing through said first and second poles for operating said operating mechanisms in response to predetermined current conditions to open said first and second sets of separable contacts; and a molded housing having first and second compartments on opposite sides of a third compartment, said first set of separable contacts and said first thermal-magnetic operating mechanism being mounted in said first compartment, said second set of separable contacts and said second thermal-magnetic operating mechanism being mounted in said second compartment, said electronic trip means being mounted in said third compartment.

2. The two pole circuit breaker of claim 1 wherein said molded housing has a first generally planar partition between said first and third compartments and a second generally planar partition between said second and third compartments and generally parallel to said first generally planar partition, said first, second and third compartments each having a width generally perpendicular to said first and second partitions, the width of said third compartment being about twice the widths of said first and second compartments.

3. The two pole circuit breaker of claim 2 wherein said electronic trip means comprises printed circuit board means mounted in said third compartment generally parallel to said generally planner first and second partitions, and at least one toroidal sensing coil housed in said third compartment with a central axis substantially parallel to said generally planar first and second partitions, and having winding means connected to said printed circuit board means, and load conductors connected to said first and second sets of separable contacts and passing through said toroidal coil parallel to said central axis.

4. The two pole circuit breaker of claim 3 wherein said electronic trip means includes common actuating means operative in response to abnormal current conditions in either said first pole or said second pole and having an operating member extending into one of said first and second compartments to actuate the operating mechanism therein, and means extending between said first and second compartments and through said third compartment for actuating the other operating mechanism.

5. The two pole circuit breaker of claim 3 wherein said molded housing comprises a molded top base having a first cavity forming said first compartment and having a first partition forming a wall of said first cavity, a top cover mating with said top base to enclose said first compartment, a molded bottom cover having a second cavity forming said second compartment, a molded bottom base mating with said molded bottom cover and having a second partition enclosing said second compartment and having a third cavity separated from said second compartment by said second partition, and a hollow center base mating with said top and bottom bases to form with said third cavity said third compartment between said first and second partitions.

6. A two pole circuit breaker comprising:

first and second sets of separable contacts forming first and second poles;

operating means comprising first and second thermal-magnetic operating mechanisms for operating said first and second sets of electrical contacts respectively, and electronic trip means connected to said first and second poles and having a common actuating member which is actuated when predetermined conditions are detected in either pole; and a molded housing having first and second compartments on opposite sides of a third compartment, said first set of separable contacts and said first thermal-magnetic operating mechanism being mounted in said first compartment, said second set of separable contacts and said second thermal-magnetic operating mechanism being mounted in said second compartment, and said electronic trip means being mounted in said third compartment, said common actuating means extending into one of said first and second compartments from said third compartment to actuate one of said first and second thermal-magnetic operating mechanisms to open one of said first and second sets of separable contacts, and wherein said operating mechanism includes common trip means extending through said third compartment to actuate the other of said first and second thermal-magnetic operating mechanisms to open the other of said first and second sets of contacts.

7. The two pole circuit breaker of claim 6 wherein said molded housing has a first generally planar partition between said first and third compartments and a second generally planar partition between said second and third compartments and generally parallel to said first generally planner partition, said compartments each having a width generally perpendicular to said first and second generally planner partitions, the width of said third compartment being about twice the widths of the first and second compartments.

8. A two pole circuit breaker comprising:

first and second sets of separable contacts forming first and second poles;

operating means comprising first and second thermal-magnetic operating mechanisms for operating said first and second sets of electrical contacts respectively, and electronic trip means responsive to currents flowing through said first and second poles for operating said thermal-magnetic operating mechanisms in response to predetermined current conditions; and a molded housing comprising a molded top base having a first cavity forming a first compartment with a first partition forming a wall of said first compartment, a top cover mating with said top base to enclose said first compartment, a molded bottom cover having a second cavity forming a second compartment, a molded bottom base mating with said molded bottom cover and having a second partition enclosing said second compartment and having a third cavity separated from said second compartment by said second partition, and a hollow center base mating with said top and bottom bases to form with said third cavity a third compartment between said first and second partitions and between said first and second compartments, said first set of separable contacts and said first thermal-magnetic operating mechanism located in said first compartment, said second set of separable contacts and said second thermal-magnetic operating mechanism located in said second compartment, and said electronic trip means located in said third compartment between said first and second compartments and having common means actuating said first and second thermal-magnetic operating mechanisms in response to predetermined current conditions in said poles.

* * * * *